UNITED STATES PATENT OFFICE.

HENRY DOULTON, OF LONDON, AND JOHN SLATER, OF BURSLEM, ENGLAND.

TREATING VITREOUS SUBSTANCES FOR MAKING METALLIC CONNECTIONS THERETO.

SPECIFICATION forming part of Letters Patent No. 507,890, dated October 31, 1893.

Application filed March 28, 1893. Serial No. 468,073. (No specimens.)

*To all whom it may concern:*

Be it known that we, HENRY DOULTON, knight, of the Lambeth Pottery, Lambeth, London, in the county of Surrey, and JOHN SLATER, potter, of Waterloo Road, Burslem, in the county of Stafford, England, have invented improvements in Methods of Treating Vitreous Substances for Making Metallic Connections Thereto; and we do hereby declare the nature of our said invention and in what manner the same is to be performed to be particularly described and ascertained in and by the following statement.

Our invention refers to an improved method of making metallic connections to vitreous substances such as earthenware, china or glass as a substitute for the present plaster and other imperfect connections, say, as applied to earthenware water closets.

In carrying out our invention we prepare the earthenware at the place where the metal pipe connections are to be made, say, the inlet water pipe and the soil outlet pipe by forming thereon a metallic surface in the manner hereinafter described and to which we are enabled to solder the said metal pipes by an ordinary soldering tool or other means. It will be obvious that a sealed joint of this character possesses important sanitary advantages over the present india-rubber or putty joints. Similarly in the case of baths, sinks, lavatories, cabinet-stands, plug-basins, fountains, urinals, and other articles to which it is desirable to connect metal pipes we "prepare" the earthenware surface where the connection is to be made and when necessary modify the shape of the part to facilitate the soldering. When desirable metal unions may be attached in this manner to the earthenware to afterward receive the pipe connection, or other metallic connections may be made for other purposes. The special feature of our invention is therefore the "metallizing" or preparing of the surface of vitreous substances such as earthenware, china or glass where it is desired to make a metallic connection by an ordinary soldering or plumbing joint.

Our invention further has for its object the attaching of metal mounts to vitreous surfaces such as the mounts of scent bottles and spirit flasks heretofore fastened with cement; attaching handles to vases or jugs; mounts for dishes and plates; tea-pot handles and spouts; taps for filters and urns and all similar purposes where the connection has hitherto been imperfect and uncertain as aforesaid and consists in "preparing" the vitreous surface at that part as hereinafter described and thus we are enabled to firmly secure the parts together by soldering. In like manner earthenware handles for instance may be secured to jugs or pitchers so as to facilitate renewal in case of breakage. Said improvements are also applicable for sealing the lids of jars containing preserved fruits, vegetables and the like.

Our invention also refers to the use and application of this method of joining in connection with electrical fittings and appliances in lieu of the present system of clamping screws, say, as applied to earthenware switches and pushes. It will be obvious that such a method possesses great advantages over the present clamping devices in cheapness and certainty of electrical contact.

To prepare the metallized surface hereinbefore referred to we take one dram of bichloride of platinum well washed to eliminate the free acid and then prepare one ounce of balsam of sulphur and three ounces of spirits of turpentine (by boiling the same to a consistency of cream in a sand bath). We next take the platinum and put it on a slab slightly heated so as to evaporate any moisture left from the washing and while warm mix the balsam (before described) with the platinum adding oil of turpentine until the proper consistency for working with a camel hair brush is obtained and with this we coat the vitreous surface at the desired part and afterward fire in an enamel kiln at a suitable temperature.

Although we have found the foregoing to be effective for preparing the "metallized" surface we may use oxide of gold or silver or platinum sponge or other similar metallic compounds which will in the same or a similar manner adhere to the vitreous substance and which will take the solder in the manner hereinbefore described.

Having thus particularly described and ascertained the nature of our said invention and in what manner the same is to be performed, we declare that what we claim is—

The process or method herein described of making a metal connection with a vitreous article, which consists in coating the joining part of the vitreous article with a metallic compound, burning in the metallic compound coating, and soldering the metal connection to the said coated and burned part of the vitreous article, substantially as described.

In testimony whereof we affix our signatures to the foregoing specification.

HENRY DOULTON.
JOHN SLATER.

Witnesses:
E. TUSHINGHAM,
   *Burslem, Cashier.*
JNO. C. BAILEY,
   *Burslem, Potter.*